United States Patent
Jain

(10) Patent No.: US 11,157,266 B2
(45) Date of Patent: Oct. 26, 2021

(54) CLOUD APPLICATION UPDATE WITH REDUCED DOWNTIME

(71) Applicant: SAP SE, Walldorf (DE)

(72) Inventor: Shashank Mohan Jain, Walldorf (DE)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 16/595,889

(22) Filed: Oct. 8, 2019

(65) Prior Publication Data
US 2021/0103441 A1    Apr. 8, 2021

(51) Int. Cl.
*G06F 8/656* (2018.01)

(52) U.S. Cl.
CPC .................. *G06F 8/656* (2018.02)

(58) Field of Classification Search
None
See application file for complete search history.

(56) References Cited

U.S. PATENT DOCUMENTS

| | | | | |
|---|---|---|---|---|
| 8,799,419 B1* | 8/2014 | Lin | ..................... | G06F 9/45558 709/220 |
| 8,799,422 B1* | 8/2014 | Qu | ......................... | H04L 49/70 709/220 |
| 8,943,489 B1* | 1/2015 | Qu | ......................... | G06F 8/656 717/168 |
| 9,244,676 B2* | 1/2016 | Kamble | .................. | G06F 8/656 |
| 9,507,586 B2* | 11/2016 | Kamble | .................. | G06F 8/656 |
| 9,760,400 B1* | 9/2017 | Emelyanov | ........... | G06F 9/4856 |
| 10,146,525 B2* | 12/2018 | Vaguine | ............. | H04L 65/1006 |
| 10,394,531 B2* | 8/2019 | Hulick | ..................... | G06F 11/34 |
| 10,530,815 B2* | 1/2020 | Chou | ...................... | H04L 63/20 |
| 10,534,601 B1* | 1/2020 | Venkata | .................. | H04L 45/74 |
| 10,735,430 B1* | 8/2020 | Stoler | ..................... | H04L 63/10 |
| 2014/0047115 A1* | 2/2014 | Lipscomb | ............... | G06F 9/485 709/226 |

(Continued)

OTHER PUBLICATIONS

Qiang, Weizhong, et al. "MUC: Updating cloud applications dynamically via multi-version execution." Future Generation Computer Systems 74 (2017): 254-264. (Year: 2017).*

(Continued)

*Primary Examiner* — Matthew J Brophy
(74) *Attorney, Agent, or Firm* — Buckley, Maschoff & Talwalkar LLC

(57) ABSTRACT

An updater platform may create a listening delegator process, associated with a listener file descriptor, within a deployment (without implementing an accept protocol). The platform may execute an original instance of an application process within the deployment and intercept a socket creation call from the original instance of the application process and replace it with the listener file descriptor. As a result, incoming connection requests are received by the listening delegator process and forwarded to the original instance of the application process. The platform may then determine that a configuration update is to be made to the application process and start an additional instance of the application process, with the updated configuration, within the deployment, such that incoming connection requests are received by the listening delegator process and forwarded to the additional instance of the application process. The platform may then switch off the original instance of the application process.

13 Claims, 16 Drawing Sheets

(56) References Cited

U.S. PATENT DOCUMENTS

| | | | |
|---|---|---|---|
| 2014/0101649 A1* | 4/2014 | Kamble | G06F 9/45558 717/170 |
| 2014/0101652 A1* | 4/2014 | Kamble | G06F 8/656 717/171 |
| 2015/0033324 A1* | 1/2015 | Fainkichen | C09J 7/30 726/15 |
| 2016/0127321 A1* | 5/2016 | Fainkichen | G06F 9/45529 726/4 |
| 2018/0039494 A1* | 2/2018 | Lander | H04L 63/0815 |
| 2018/0115586 A1* | 4/2018 | Chou | G06F 8/656 |
| 2018/0293067 A1* | 10/2018 | Hirshberg | G06F 9/45558 |
| 2018/0314498 A1* | 11/2018 | Hulick | G06F 11/3409 |
| 2020/0201624 A1* | 6/2020 | Halder | H04L 67/1034 |

OTHER PUBLICATIONS

Shen, Zhiming, et al. "X-containers: Breaking down barriers to improve performance and isolation of cloud-native containers." Proceedings of the Twenty-Fourth International Conference on Architectural Support for Programming Languages and Operating Systems. 2019. (Year: 2019).*

Marty, Michael, et al. "Snap: a microkernel approach to host networking." Proceedings of the 27th ACM Symposium on Operating Systems Principles. 2019. (Year: 2019).*

Thalheim, Jörg, et al. "Cntr: Lightweight {OS} Containers." 2018 {USENIX} Annual Technical Conference ({USENIX}{ATC} 18). 2018. (Year: 2018).*

* cited by examiner

CLOUD APPLICATION UPDATE WITH REDUCED DOWNTIME

BACKGROUND

An enterprise may utilize applications or services executing in a cloud computing environment. For example, a business might utilize applications that execute at a data center to process purchase orders, human resources tasks, payroll functions, etc. Such applications typically execute in a deployment, such as a Virtual Machine ("VM") or container. In some cases, an application nay need to be updated (e.g., to a new configuration). To perform such an update, an application might be taken offline during the update process. Such an approach may not be acceptable to a customer. To avoid downtime, another copy of the application might be executed in another deployment. This approach, however, requires that a substantial amount of resources (e.g., twice the usual amount of resources) need to be allocated during the update which can be an expensive proposition. Moreover, the time it takes to create the additional deployment may impose additional overhead.

It would therefore be desirable to provide reduced downtime when updating an application in a cloud-based computing environment in a secure, automatic, and accurate manner.

SUMMARY

Methods and systems may be associated with a cloud computing environment. An updater platform may create a listening delegator process, associated with a listener file descriptor, within a deployment (without implementing an accept protocol). The platform may execute an original instance of an application process within the deployment and intercept a socket creation call from the original instance of the application process and replace it with the listener file descriptor. As a result, incoming connection requests are received by the listening delegator process and forwarded to the original instance of the application process. The platform may then determine that a configuration update is to be made to the application process and start an additional instance of the application process, with the updated configuration, within the deployment, such that incoming connection requests are received by the listening delegator process and forwarded to the additional instance of the application process. The platform may then switch off the original instance of the application process.

Some embodiments comprise: means for creating a listening delegator process, associated with a listener file descriptor, within a deployment, wherein the listening delegator processor does not implement an accept protocol; means for executing an original instance of an application process within the deployment; means for intercepting a socket creation call from the original instance of the application process and replace it with the listener file descriptor such that incoming connection requests are received by the listening delegator process and forwarded to the original instance of the application process; means for determining that a configuration update is to be made to the application process: means for starting an additional instance of the application process, with the updated configuration, within the deployment, such that incoming connection requests are received by the listening delegator process and forwarded to the additional instance of the application process: and means for switching off the original stance of the application process.

Some technical advantages of some embodiments disclosed herein are improved systems and methods to provide reduced downtime when updating an application in a cloud-based computing environment in a secure, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1A:
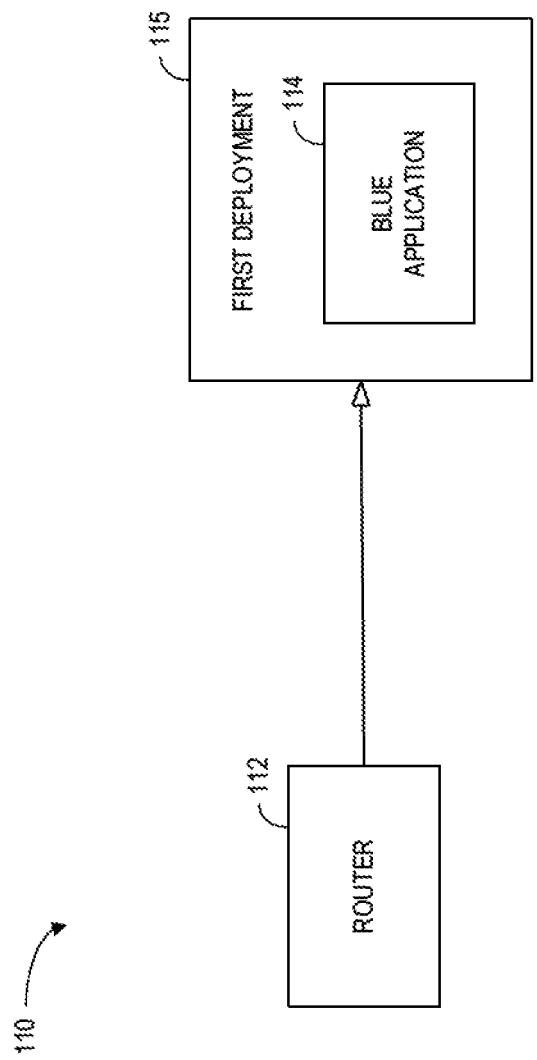
FIGS. 1A through 1C illustrate a blue-green update approach.

To update an application executing in a cloud computing environment, while incurring little or no downtime and reduced risk, a "Blue-Green" update process may be performed. As used herein, the phrase "Blue-Green" may refer to an update technique that reduces downtime and risk by running two identical production environments called Blue and Green. At any time, only one of the environments mot be live, with the live environment serving production traffic. FIG. 1A is a high-level block diagram of a computing system 110. In particular, a router 112 may send traffic to a Blue application 114 executing within a first deployment 115 (e.g., a VM or container). For this example, Blue is currently live and Green is idle.

Figure 1B:
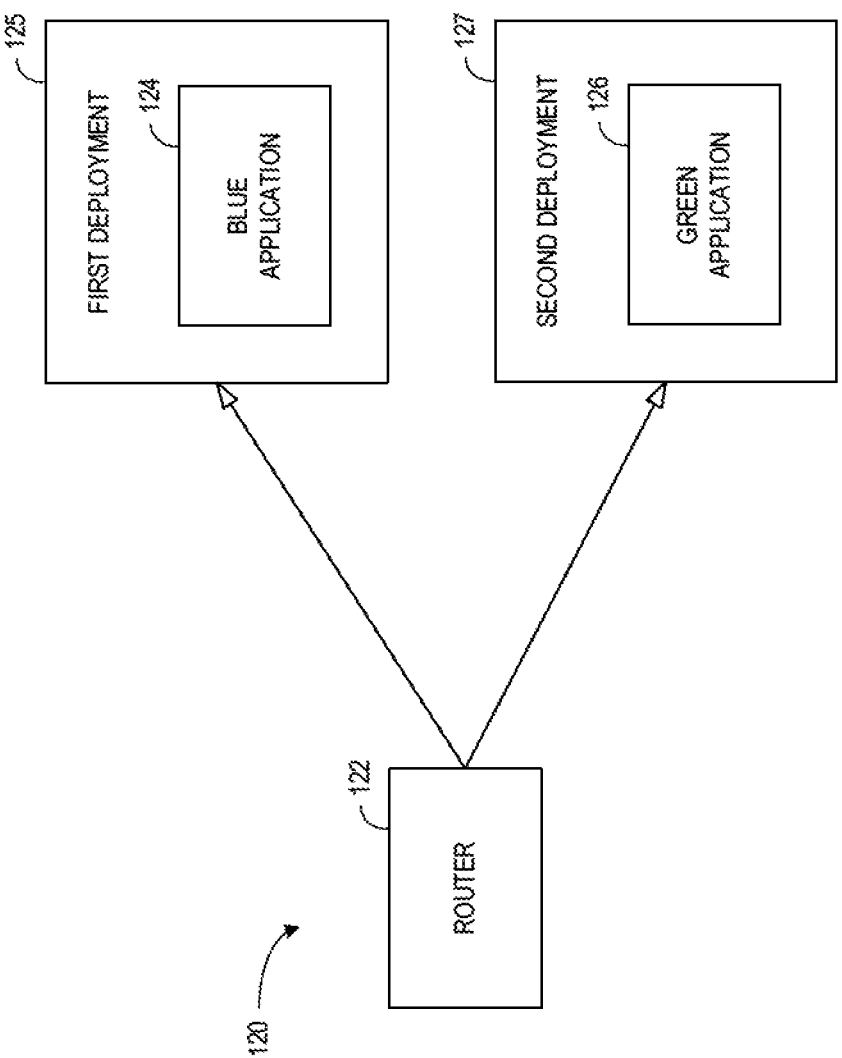

The system may now make a change to the application (e.g., a configuration update). The changed version may comprise the Green as illustrated by the system 120 in FIG. 1B. As before, a router 122 may send traffic to a Blue application 124 executing within a first deployment 125. In this case, however, another version of the application 126—Green (representing the updated configuration)—is executing in a second deployment 127. Now that both applications 124, 127 are up and running, the router 122 may be switched so that all incoming requests go to the Green application 126 and the Blue application 124. In some cases, the router 122 may begin load balancing traffic between Blue 124 and Green 126.

Figure 1C:
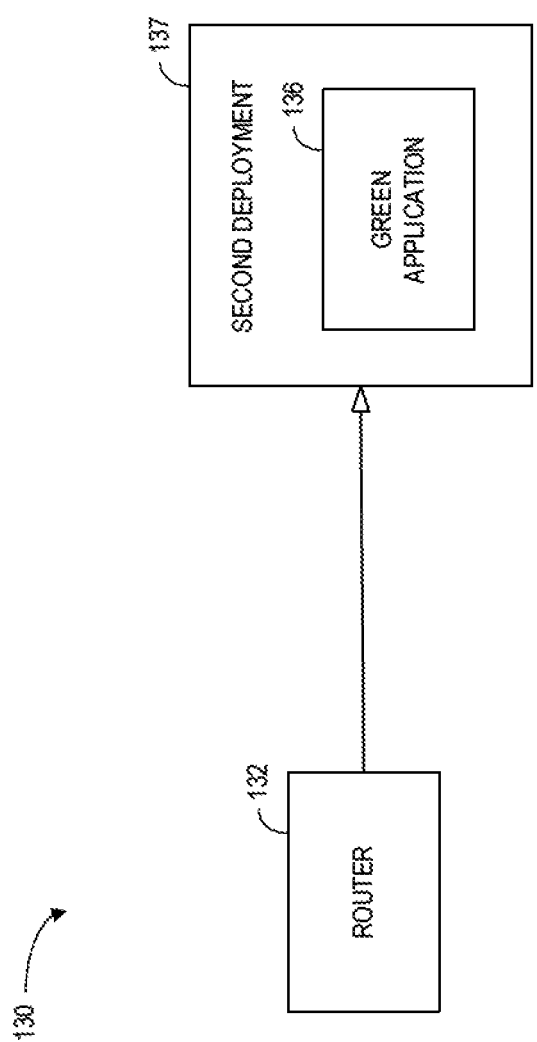

Once it is verified that Green 126 is running as expected, the router 122 may stop routing requests to Blue 124 as illustrated by the system 130 in FIG. 1C. Now, a router 132 only sends traffic to a Green application 136 executing within a second deployment 137. Blue may be decommissioned or kept it in case it is needed to roll back the changes.

Figure 2:
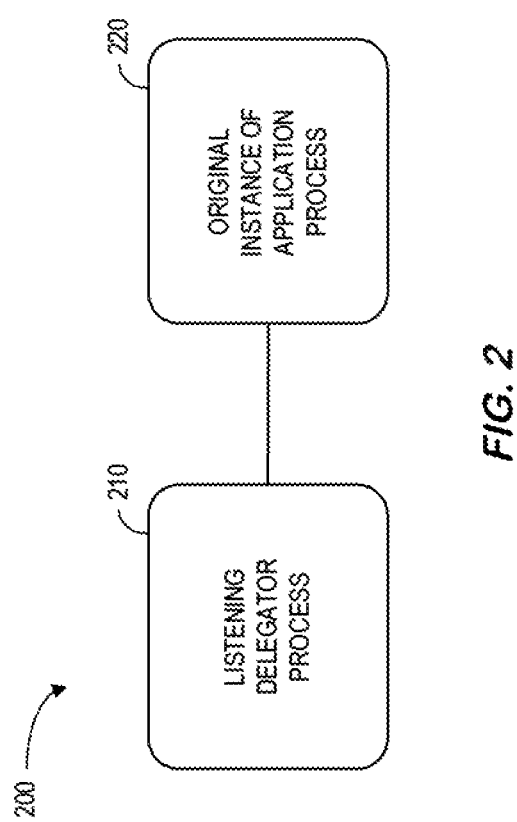
FIG. 2 is a high-level system architecture in accordance with some embodiments.

Although the Blue-Green approach reduces downtime and risk, it requires that two deployments be created (one for Blue and one for Green) which mot represent an expensive or impractical proposition. To provide improved reduced downtime when updating an application in a cloud-based computing environment in a secure, automatic, and accurate manner, FIG. 2 is a high-level system 200 architecture in accordance with some embodiments. The system 200 includes a listening delegator process 210 and an original instance of an application process 220. As used herein, devices, including those associated with the system 200 and any other device described herein, may exchange information via any communication network Which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The listening delegator process 210 may store information into and/or retrieve information from various data stores, which may be locally stored or reside remote from the listening delegator process 210. Although a single listening delegator process 210 and original instance of the application process 220 are shown in FIG. 2, any number of such devices may be included. Moreover, various devices described herein might be combined according to embodiments of the present invention. For example, in some embodiments, the listening delegator process 210 and the original instance of the application process 220 might comprise a single apparatus. The system 200 functions may be performed by a constellation of networked apparatuses, such as in a distributed processing or cloud-based architecture.

A user may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations or results from the system 200.

Figure 3:
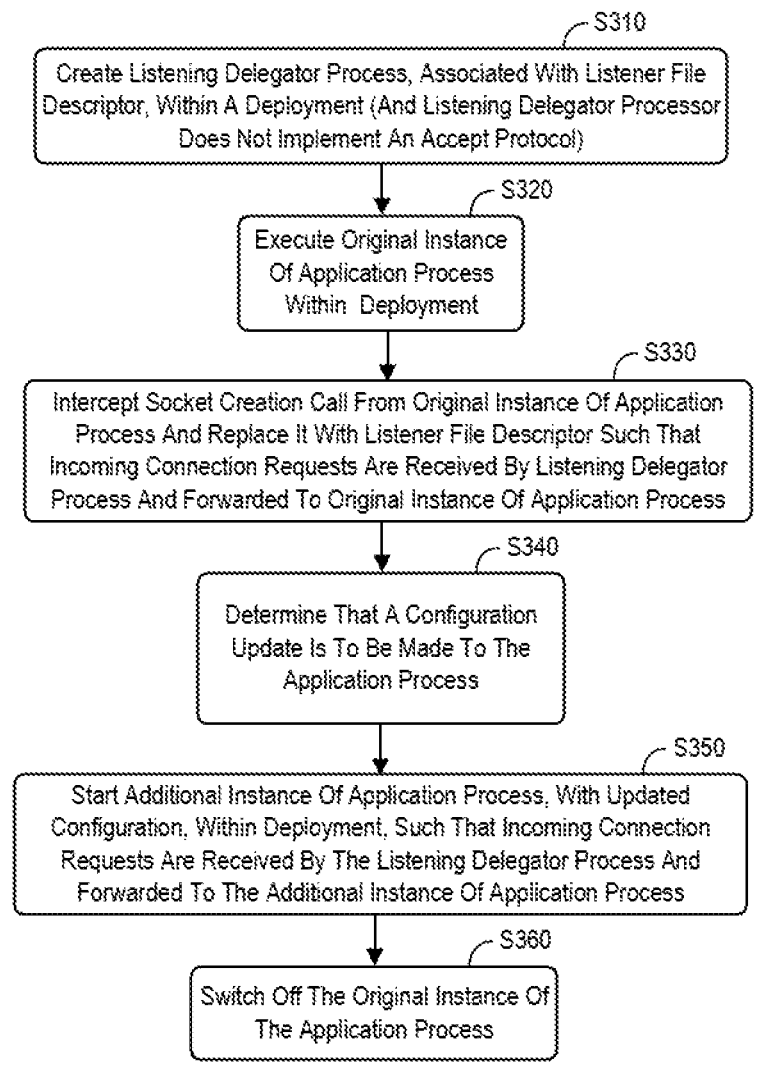
FIG. 3 is a method according to some embodiments.

FIG. 3 is a method that might be performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S310, the system may create a listening delegator process, associated with a listener file descriptor, within a deployment (e.g., a VM or container). According to some embodiments, the listening delegator processor does not implement an accept protocol. At S320, the system may execute an original instance of an application process within the deployment. At S330, the system may intercept a socket creation call from the original instance of the application process and replace it with the listener file descriptor. As a result, incoming connection requests may be received by the listening delegator process and forwarded to the original instance of the application process.

At S340, the system may determine that a configuration update is to be made to the application process. At S350, the system may start an additional instance of the application process, with the updated configuration, within the deployment. At this point, incoming connection requests may be received by the listening delegator process and forwarded to the additional instance of the application process. Now that the updated configuration is up and running, the system may switch off the original instance of the application process at S360 (with little or no downtime being experienced).

Thus, embodiments may provide zero (or near zero) downtime in-place Blue-Green updates for cloud applications. According to some embodiments, a hot reloading of the application is performed in place. Some embodiments utilize two powerful LINUX concepts to achieve a zero (or near zero) downtime configuration update. In Linux a Transmission Control Protocol ("TCP") socket is represented as a file. Each file is represented in user space by a handle called a "file descriptor." Moreover, each process has a set of open file descriptors (e.g., disk files or sockets). In addition, the kernel has a powerful mechanism called "ancillary data" which can be used to transfer file descriptors between the processes running co-located within VM or container. The transfer may happen, for example, over UNIX domain sockets.

Figure 4:
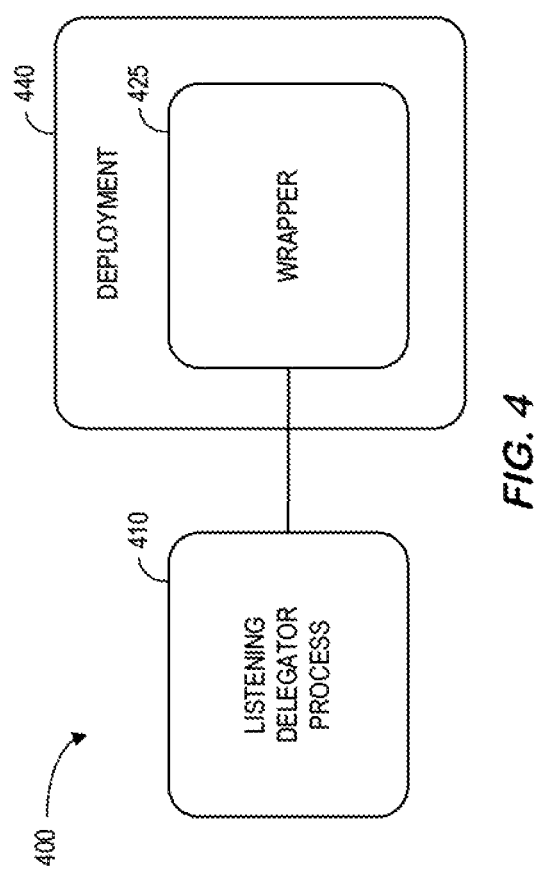
FIGS. 4 through 7 illustrate an update technique according to some embodiments.
Figure 5:
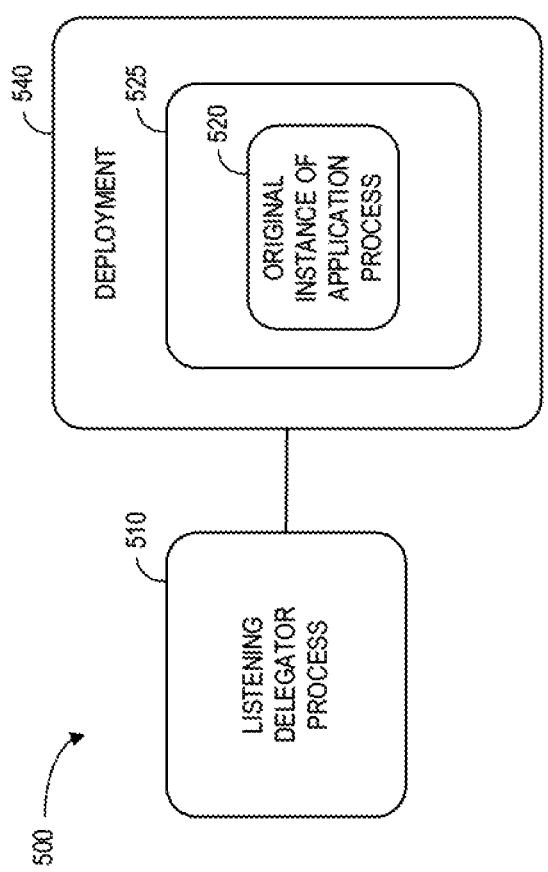
Figure 6:
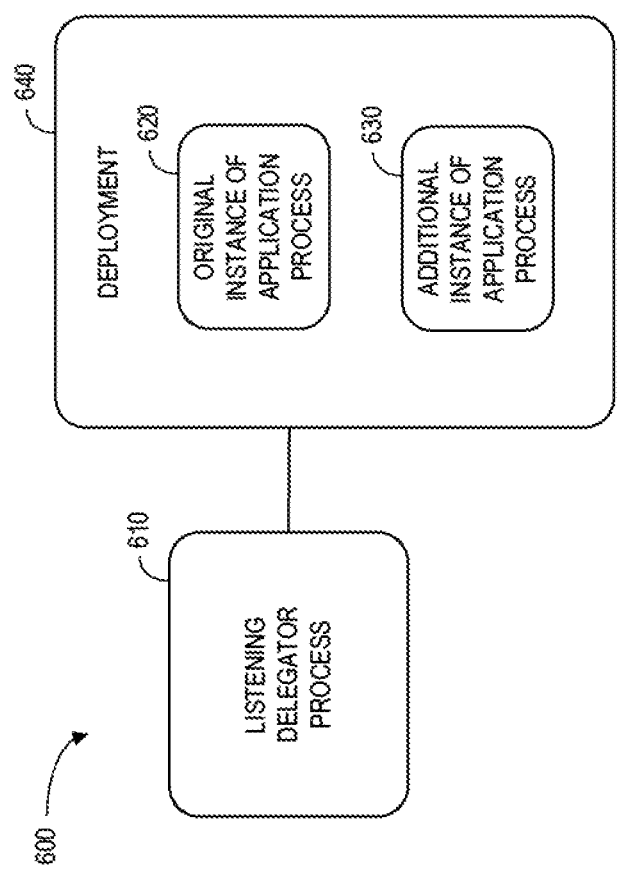
Figure 7:
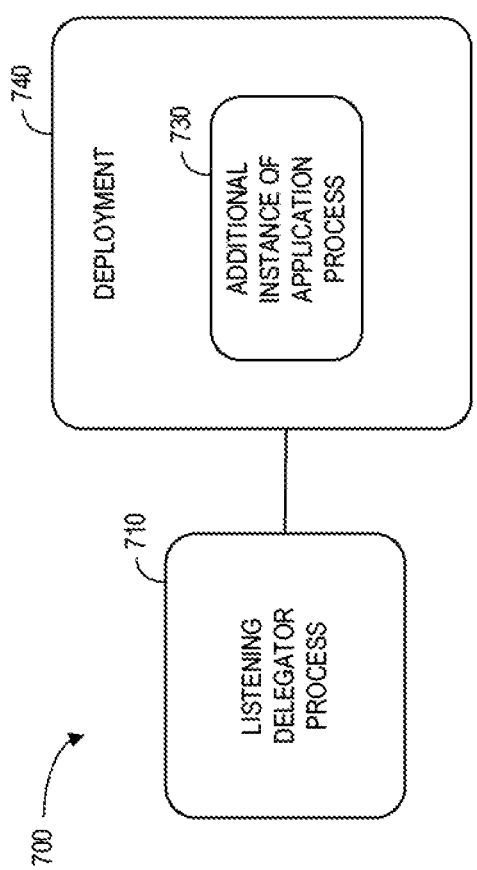

Consider, for example, FIG. 4 which illustrates a system 400 in which a listening delegator process 410 communicates with a wrapper 425 associated with a deployment 440. As illustrated in FIG. 5, a system 500 may execute an original instance of an application process within a wrapper 525 of a deployment 540 associated with a listening delegator process 510. When a configuration update is needed, FIG. 6 illustrates a system 600 wherein an additional instance of the application process 630 (with the updated configuration) executes in the same deployment 640 as the original instance of the application process 620 (and the deployment is associated with a listening delegator process 610). Both instances 620, 630 may then handle incoming traffic. After the original instance 620 is halted, FIG. 7 illustrates a system 700 wherein a listening delegator process 710 communicates with the new, updated instance of the application process 730 executing in the same deployment 740.

Consider an application A running in a container having a listener socket opened to listen to TCP connections. If the system starts another instance of the application called application B, it is possible to transfer the listener socket to application B using the send( ), recv( ) call on the domain socket and passing control messages over ancillary data. Similarly, it is possible to just create a TCP listener socket in a third process (running collocated with application. A and application B). The third process may be referred to as a "delegator" and bind to an IP address and port (without using accept). This process exposes an Application Programming Interface ("APT") to be consumed by application A and application B to request listener socket transfer.

This mechanism helps the system receive the file descriptor of the listener socket, but such an approach may have a problem How does the system inject/swap these file descriptors into a running process (e.g., application A or application B). To solve this, the system may use another tool called ptrace or gdb to swap the listener file descriptors on application A and application B with the file descriptor opened by the delegator. In some embodiments, this may help attain re-loading configurations in-place without downtime and without inclining the overhead of another container or VM.

Figure 8:
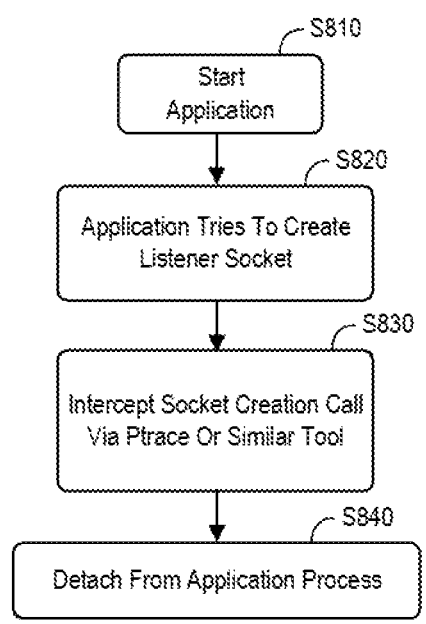
FIG. 8 illustrates a setup method in accordance with some embodiments.

The delegator may have a listener socket opened on an IP address and port. Now, when Application A comes up, it may request that the delegator to provide the listener socket (and, as a result, may then begin accepting TCP connections). A wrapper around the applications may perform this request handling, to get the file descriptor from the delegator. When the listener file descriptor is received, the wrapper may perform the method illustrated in FIG. 8.

At S810, the system may start application A. At S820, application A attempts to create a listener socket (via a bind call). The system may intercept that socket creation call via ptrace (or a similar tool) and swap the file descriptor received from the delegator. In effect, what the system makes this process use the listen file descriptor created by delegator. Since delegator doesn't implement accept, until application A comes up the connections will be queued. At S840, the system may detach from application A.

Figure 9:
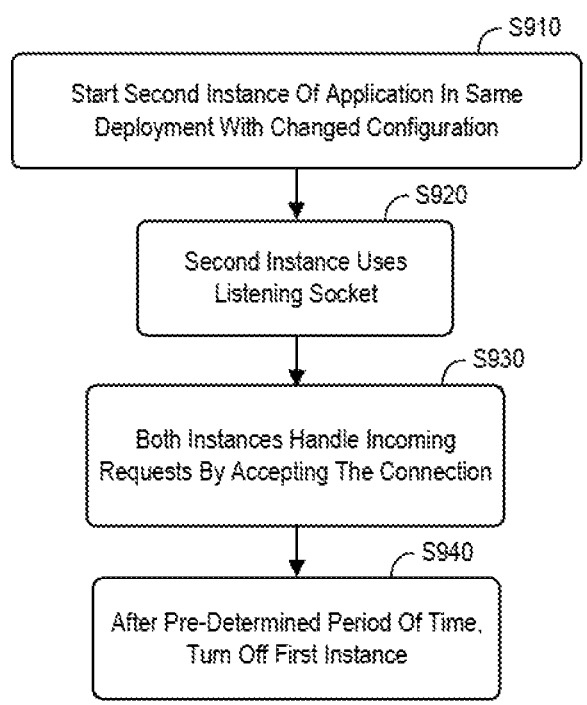
FIG. 9 illustrates a configuration update method in accordance with some embodiments.

Now consider a situation where application A needs a configuration update. FIG. 9 illustrates a method associated with such a process. In general, the system may keep application A running as well as starting application B with the changed, updated configuration (co-located) at S910. Once application B starts, it performs the same workflow as described in connection with FIG. 8 at S920 and starts listening to the listen socket. For some period of time, both application A and application B might handle incoming requests by accepting the connection at S930. After few seconds, or a pre-determined period of time, the system may switch off application A at S940. As a result, there is little or no downtime involved in upgrading the application.

Thus, a Blue-Green deployment may be performed in a highly optimized way. Moreover, embodiments may be sympathetic to costs and resource usage. Since this is an in-place Blue-Green process, it needs substantially the same resources that the customer requested (and not double that amount to do an update). Embodiments may utilize a mechanism of transferring file descriptors over domain sockets and combine this with file descriptor swap mechanism to achieve a zero (or near zero) downtime reload of a cloud based service.

Figure 10:
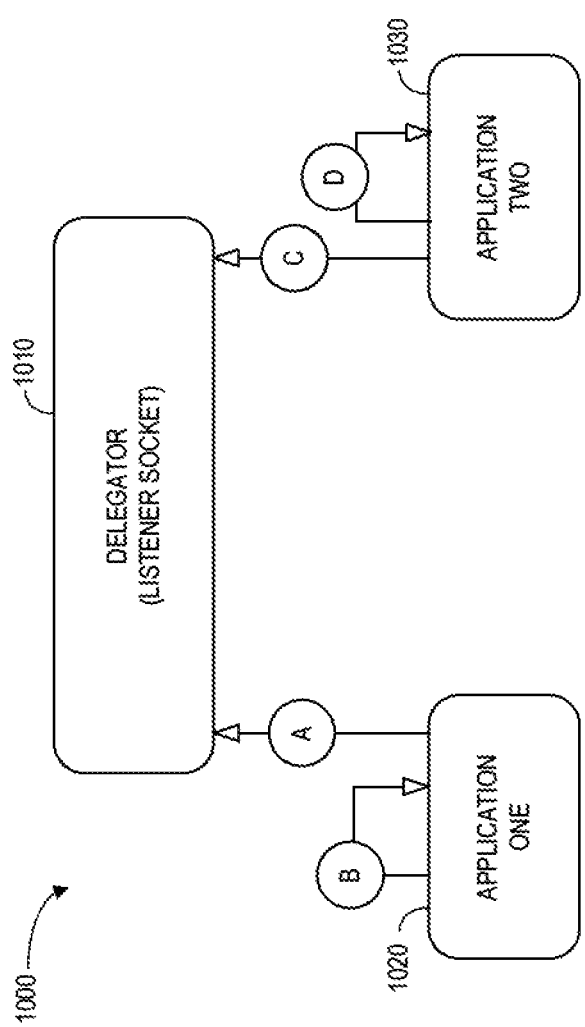
FIG. 10 is an information flow diagram of a system implemented according to some embodiments.

FIG. 10 is an information flow diagram 1000 of a system implemented according to some embodiments. As shown in the diagram 1000, during a start process a delegator or listener socket 1010 may processes a request for a file descriptor transfer at (A) in connection with a first application 1020. At (B), the first application 1020 may then start accepting connections. The delegator or listener socket 1010 may then processes a request for a file descriptor transfer in connection with a second application 1030 (e.g., another instance of the application) at (C) during a start process. At (D), the second application 1030 may begin to accept connections.

Figure 11:
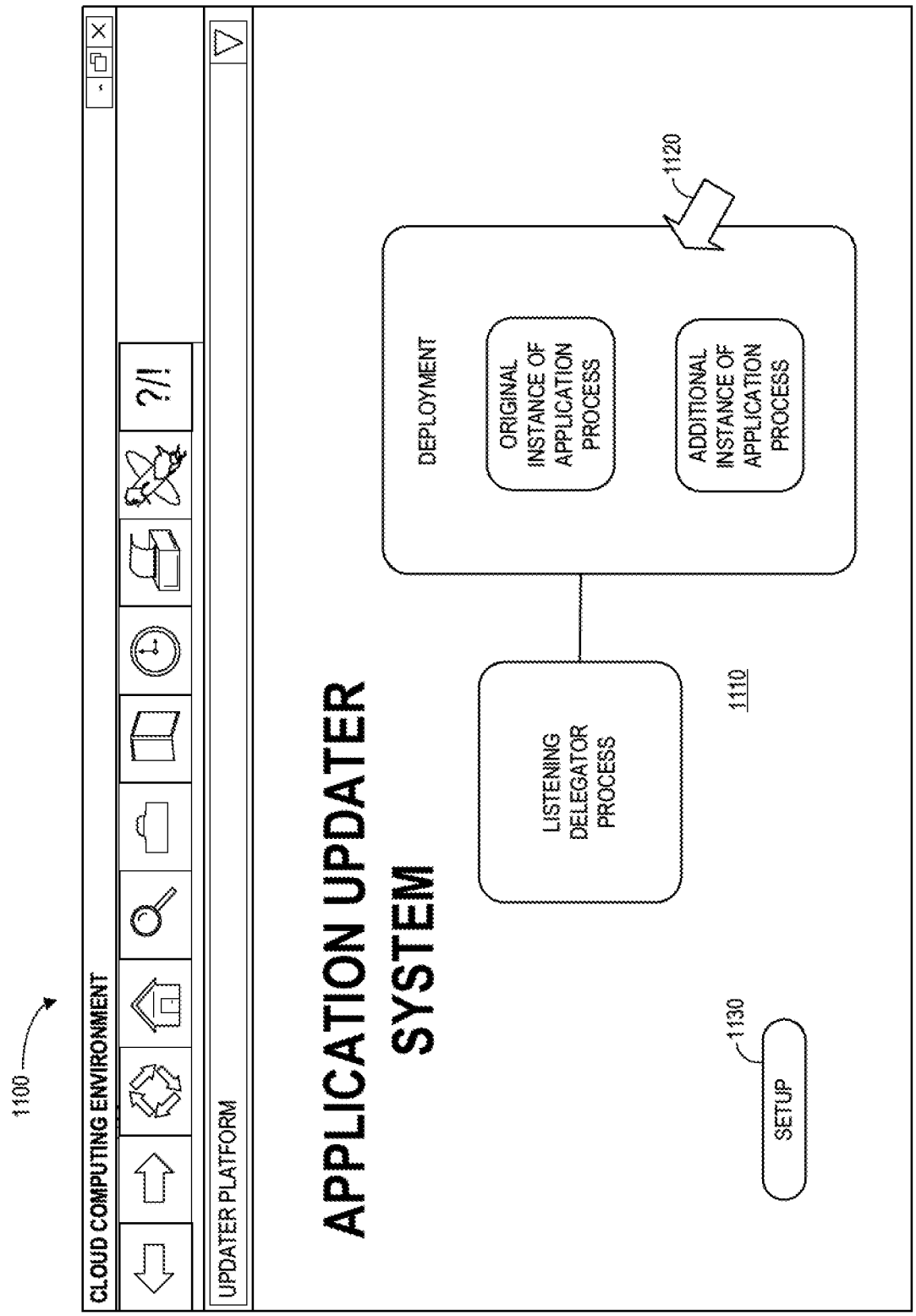
FIG. 11 is a human machine interface display according to some embodiments.

FIG. 11 is a human machine interface display 1100 in accordance with some embodiments. The display 1100 includes a graphical representation 1110 of elements of cloud-based computing environment (e.g., to efficiently perform a Blue-Green update). Selection of an element (e.g., via a touch-screen or computer pointer 1120) may result in display of a pop-up window containing various options (e.g., to adjust rules or logic, assign various devices, etc.). The display 1100 may also include a user-selectable "Setup" icon 1130 (e.g., to configure parameters for cloud management/provisioning (e.g., to alter or adjust processes as described with respect any of the embodiments of FIGS. 2 through 9)).

Figure 12:
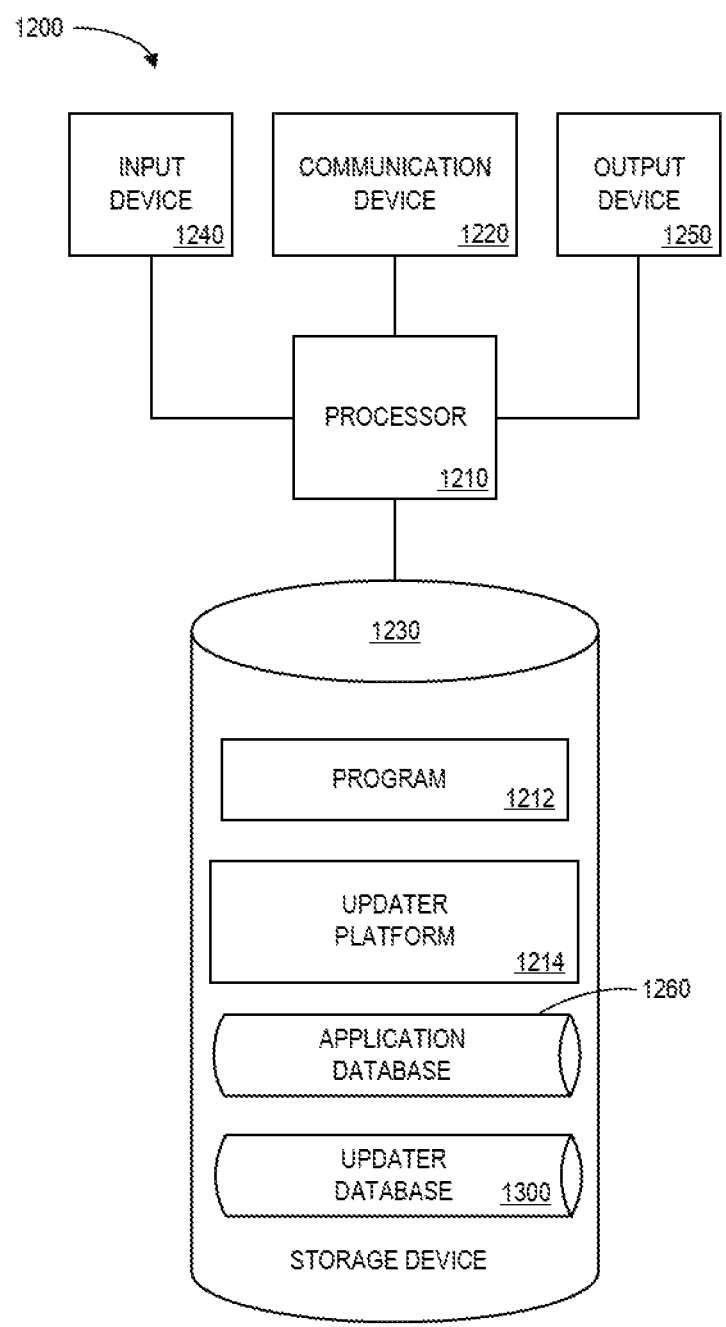
FIG. 12 is an apparatus or platform according to some embodiments.

Note that the embodiments described herein may be implemented using any number of different hardware configurations. For example, FIG. 12 is a block diagram of an apparatus or platform 1200 that may be, for example, associated with the system 200 of FIG. 2 (and/or any other system described herein). The platform 1200 comprises a processor 1210, such as one or more commercially available Central Processing Units ("CPUs") in the form of one-chip microprocessors, coupled to a communication device 1260 configured to communicate via a communication network (not shown in FIG. 12). The communication device 1260 may be used to communicate, for example, with one or more remote user platforms, cloud resource providers, etc. The platform 1200 further includes an input device 1240 (e.g., a computer mouse and/or keyboard to input rules or logic) and/an output device 1250 (e.g., a computer monitor to render a display, transmit recommendations, and/or create data center reports). According to some embodiments, a mobile device and/or PC may used to exchange information with the platform 1200.

The processor 1210 also communicates with a storage device 1230. The storage device 1230 can be implemented as a single database or the different components of the storage device 1230 can be distributed using multiple databases (that is, different deployment information storage options are possible). The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or updater platform 1214 for controlling the processor 1210. The processor 1210 performs instructions of the programs 1212, 1214, and thereby operates in accordance with any of the embodiments described herein. For example, the processor 1210 may create a listening delegator process, associated with a listener file descriptor, within a deployment (without implementing an accept protocol). The processor 1210 may execute an original instance of an application process within the deployment and intercept a socket creation call from the original instance of the application process and replace it with the listener file descriptor. As a result, incoming connection requests are received by the listening delegator process and forwarded to the original instance of the application process. The processor 1210 may then determine that a configuration update is to be made to the application process and start an additional instance of the application process, with the updated configuration, within the deployment, such that incoming connection requests are received by the listening delegator process and forwarded to the additional instance of the application process. The processor 1210 may then switch off the original instance of the application process.

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores an application database 1260 and an updater database 1300. An example of a database that may be used in connection with the platform 1200 will now be described detail with respect to FIG. 13. Note that the database described herein is only one example, and additional and/or different information may be stored therein. Moreover, various databases might be split or combined in accordance with any of the embodiments described herein.

Figure 13:
FIG. 13 illustrates an updater database in accordance with some embodiments.

Referring to FIG. 13, a table is shown that represents the updater database 1300 that may be stored at the platform 1300 according to some embodiments. The table may include, for example, entries identifying applications and configuration updates that may need to be made to those applications. The table may also define fields 1302, 1304, 1306, 1308, for each of the entries. The fields 1302, 1304, 1306, 1308 may, according to some embodiments, specify an update identifier 1302, a deployment identifier 1304, an original application identifier 1306, and an additional application identifier 1308. The updater database 1300 may be created and updated, for example, when a new application is executed, a new configuration update is identified, etc. According to some embodiments, the updater database 1300 may further store details about connections (e.g., TCP sockets, IP addresses, ports, etc.).

The update identifier 1302 might be a unique alphanumeric label or link that is associated with a configuration update that has been (or will be) performed in a cloud computing environment. The deployment identifier 1304 might specify a VM, container, or other deployment associated with the update. The original application identifier 1306 may identify a software process executing in a cloud computing environment. The additional application identifier 1308 may identify a second version of the original application 1306 (executing in the same deployment 1304) that includes the updated configuration and will eventually replace the original application 1306.

Thus, embodiments may provide reduced downtime when updating an application in a cloud-based computing environment in a secure, automatic, and accurate manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 14:
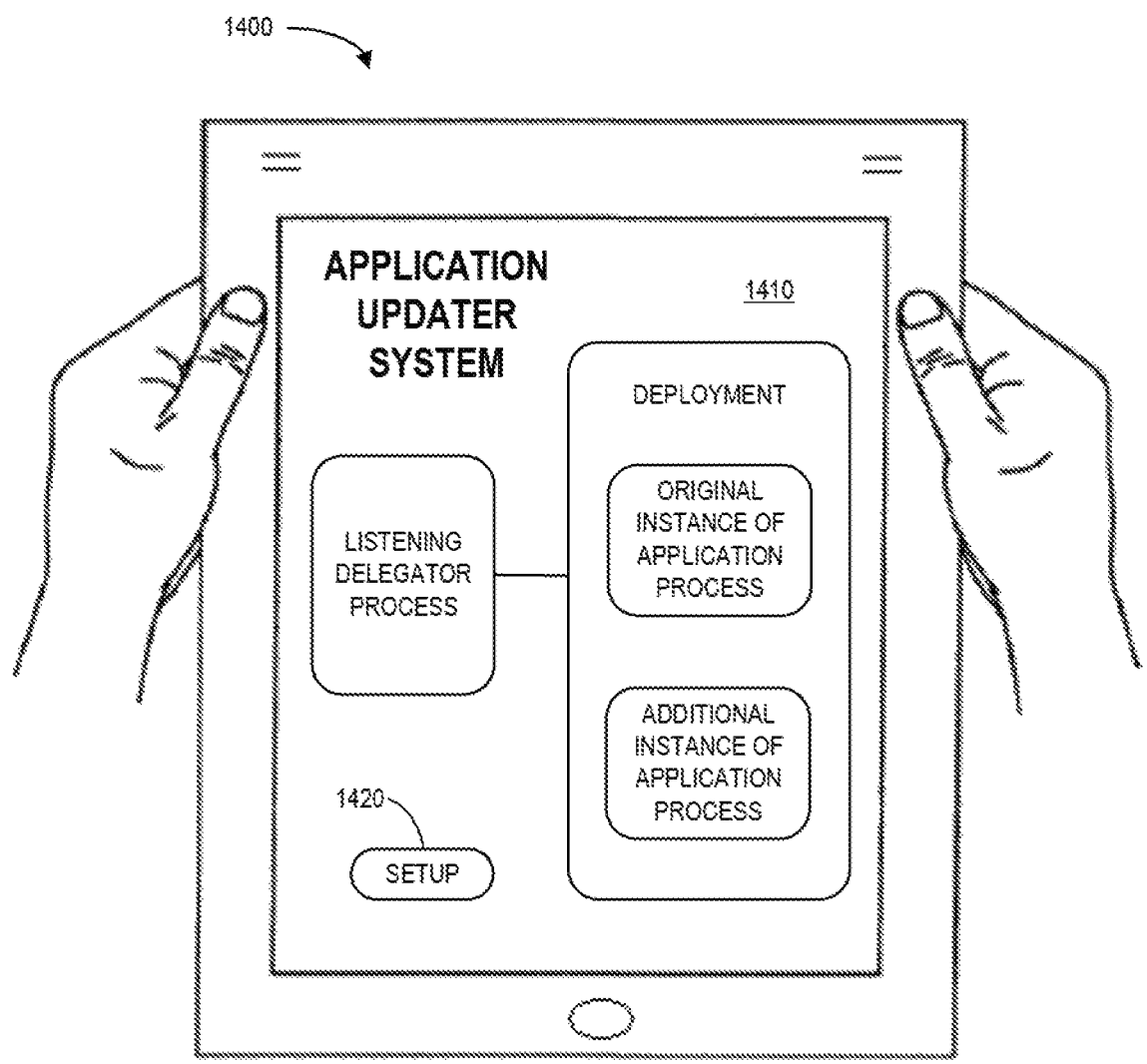
FIG. 14 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 14 shows a tablet computer 1400 rendering an application updater system display 1410. The display 1410 may, according to some embodiments, be used to view more detailed elements about components of the system (e.g., when a graphical element is selected via a touchscreen) or to configure operation of the system (e.g., to establish new rules or logic for the system via a "Setup" icon 1420).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud-based computing environment, comprising:
   an updater platform, including:
      a computer processor, and
      a memory storage device including instructions that when executed by the computer processor enable the system to:
      (i) create a listener socket in a delegator process, the listener socket having a listener file descriptor and the delegator process being associated with a deployment, wherein the delegator process does not implement an accept protocol,
      (ii) execute an original instance of an application process within the deployment,
      (iii) intercept, by a wrapper around the original instance of an application process, a socket creation call from the original instance of the application process and replace it with the listener file descriptor of the delegator process such that incoming connection requests are received by the delegator process and forwarded to the original instance of the application process,
      (iv) determine that a configuration update is to be made to the application process,
      (v) start an additional instance of the application process with the configuration update within the deployment and in the wrapper,
      (vi) intercept, by the wrapper, a socket creation call from the additional instance of the application process and replace it with the listener file descriptor of the delegator process such that incoming connection requests are received by the delegator process and forwarded to the additional instance of the application process, wherein both the original and the additional instances handle incoming connection requests for a pre-determined period of time, and
      (vii) switch off the original instance of the application process at the conclusion of the predetermined period of time.

2. The system of claim 1, wherein the deployment comprises at least one of: (i) a virtual machine, and (ii) a container.

3. The system of claim 1, wherein the updater platform is implemented via a Linux operating system.

4. The system of claim 3, wherein the delegator process is open on and bound to an Internet Protocol ("IP") address and port.

5. The system of claim 3, wherein the incoming connection requests are associated with Transmission Control Protocol ("TCP") sockets.

6. The system of claim 3, wherein intercepted incoming connection requests have file descriptors replaced using ptrace or gdb.

7. A computer-implemented method associated with a cloud-based computing environment, comprising:
creating a listener socket in a delegator process, the listener socket having a listener file descriptor and the delegator process being associated with a deployment, wherein the delegator processor does not implement an accept protocol;
executing an original instance of an application process within the deployment;
intercepting, by a wrapper around the original instance of an application process, a socket creation call from the original instance of the application process and replace it with the listener file descriptor of the delegator process such that incoming connection requests are received by the delegator process and forwarded to the original instance of the application process;
determining that a configuration update is to be made to the application process;
starting an additional instance of the application process with the configuration update within the deployment and in the wrapper,
intercept, by the wrapper, a socket creation call from the additional instance of the application process and replace it with the listener file descriptor of the delegator process such that incoming connection requests are received by the delegator process and forwarded to the additional instance of the application process, wherein both the original and the additional instances handle incoming connection requests for a pre-determined period of time; and
switching off the original instance of the application process at the conclusion of the predetermined period of time.

8. The method of claim 7, wherein the deployment comprises at least one of: (i) a virtual machine, and (ii) a container.

9. A non-transitory, computer readable medium having executable instructions stored therein, the medium comprising:
instructions to creating a listener socket in a delegator process, the listener socket having a listener file descriptor and the delegator process being associated with a deployment, wherein the delegator processor does not implement an accept protocol;
instructions to execute an original instance of an application process within the deployment;
instructions to intercept, by a wrapper around the original instance of an application process, a socket creation call from the original instance of the application process and replace it with the listener file descriptor of the delegator process such that incoming connection requests are received by the delegator process and forwarded to the original instance of the application process;
instructions to determine that a configuration update is to be made to the application process;
instructions to start an additional instance of the application process with the configuration update within the deployment and in the wrapper,
instructions to intercept, by the wrapper, a socket creation call from the additional instance of the application process and replace it with the listener file descriptor of the delegator process such that incoming connection requests are received by the delegator process and forwarded to the additional instance of the application process, wherein both the original and the additional instances handle incoming connection requests for a pre-determined period of time; and
instructions to switch off the original instance of the application process at the conclusion of the predetermined period of time.

10. The medium of claim 9, wherein the updater platform is implemented via a Linux operating system.

11. The medium of claim 10, wherein the listening delegator process is open on and bound to an Internet Protocol ("IP") address and port.

12. The medium of claim 10, wherein the incoming connection requests are associated with Transmission Control Protocol ("TCP") sockets.

13. The medium of claim 10, wherein intercepted incoming connection requests have file descriptors replaced using ptrace or gdb.

* * * * *